United States Patent [19]

Varnagy

[11] Patent Number: 4,698,998
[45] Date of Patent: Oct. 13, 1987

[54] PRESSURE CALIBRATION SYSTEMS AND CONTROL VALVE ASSEMBLIES

[75] Inventor: Stephen Varnagy, Danbury, Conn.

[73] Assignee: Consolidated Controls Corporation, Bethel, Conn.

[21] Appl. No.: 888,825

[22] Filed: Jul. 22, 1986

[51] Int. Cl.$^4$ .................. G01L 27/00; F16K 1/04; F16K 1/38; F16K 1/42

[52] U.S. Cl. .................. 73/4 R; 251/122; 251/332; 137/596; 137/601

[58] Field of Search .......... 73/4 R, 4 V; 251/332, 251/122; 137/596, 601

[56] References Cited

U.S. PATENT DOCUMENTS

| | | |
|---|---|---|
| Re. 26,998 | 12/1970 | Brown . |
| 2,546,055 | 3/1951 | Ballard . |
| 2,986,372 | 5/1961 | Yocum . |
| 2,994,343 | 8/1961 | Banks . |
| 3,071,344 | 1/1963 | Banks . |
| 3,096,096 | 7/1963 | Banks . |
| 3,160,390 | 12/1964 | Banks . |
| 3,228,655 | 1/1966 | Weise .............................. 251/122 X |
| 3,233,863 | 2/1966 | Bowen et al. .................. 251/332 X |
| 3,318,577 | 5/1967 | Banks . |
| 3,326,516 | 6/1967 | Sachnik . |
| 3,334,654 | 8/1967 | Donner . |
| 3,512,550 | 5/1970 | Ammann . |
| 3,567,178 | 3/1971 | Nelson . |
| 3,584,654 | 6/1971 | Deloye . |
| 3,699,810 | 10/1972 | Takahashi ........................ 73/168 |
| 3,720,487 | 3/1973 | Wiley . |
| 3,763,880 | 10/1973 | Leopold . |
| 3,884,259 | 5/1975 | Hosmer . |
| 3,957,245 | 5/1976 | Daghe . |
| 4,237,925 | 12/1980 | Urushida . |
| 4,341,370 | 7/1982 | Banks . |
| 4,569,221 | 2/1986 | Snook, Jr. ........................ 73/4 R |
| 4,575,313 | 3/1986 | Rao . |
| 4,590,576 | 5/1986 | Elpiner . |
| 4,602,657 | 7/1986 | Anderson, Jr. et al. .......... 73/4 R X |

Primary Examiner—Tom Noland
Attorney, Agent, or Firm—Mattern, Ware, Stoltz & Fressola

[57] ABSTRACT

High-pressure, micrometering valves requiring low-actuating torque are combined in a lightweight, portable pressure calibration console, housed in a common valve block. A manual pressure valve and a manual vent valve connect compressed gas from an internal storage cylinder to pressure measuring gages or transducers to be calibrated. Automatically actuated isolation valves connect and disconnect a vernier balancing cylinder assembly, permitting fine manual adjustment of calibration pressures as high as 10,000 psi. Positive shutoff combined with low-torque, fingertip control and non-jamming closure are provided by the frictionally-engaged valve components.

23 Claims, 7 Drawing Figures

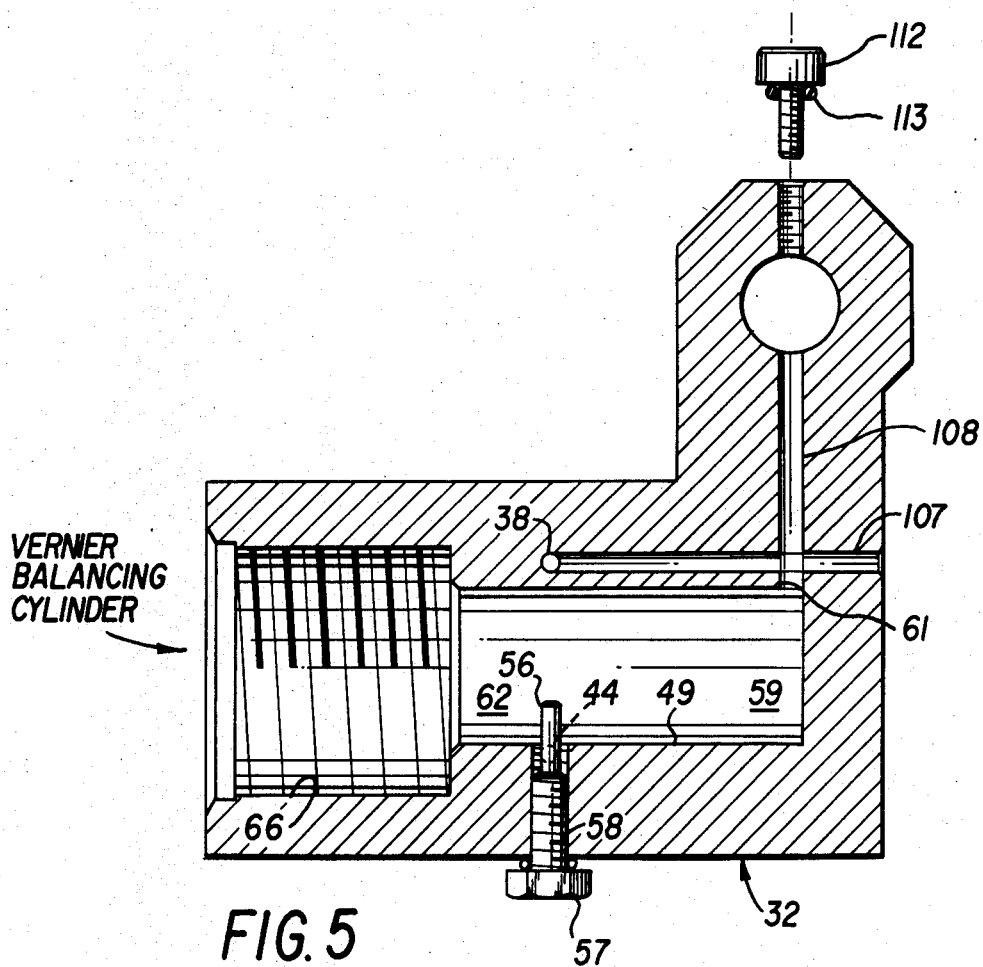
FIG. 5
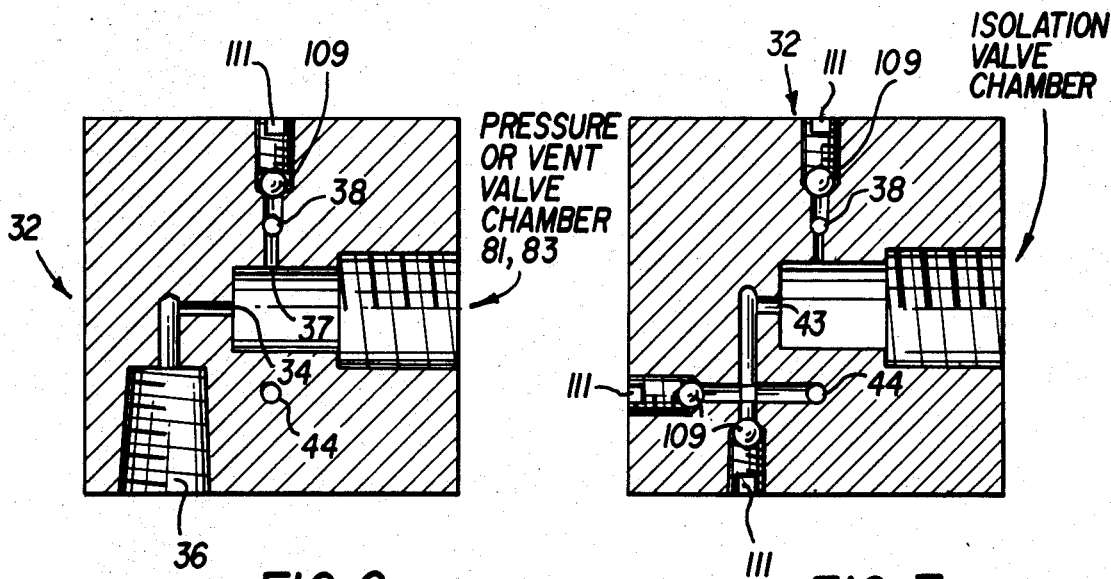
FIG. 6
FIG. 7

PRESSURE CALIBRATION SYSTEMS AND CONTROL VALVE ASSEMBLIES

This invention relates to pressure calibration systems and devices for calibrating high-pressure transducers and gaging systems, and particularly to reliable pressure control valve systems for delivering compressed gas at predetermined and selected high pressures, utilizing a vernier piston assembly for precise pressure adjustment. The systems and devices of the present invention are self-contained and portable, and they incorporate control valves and isolation valves providing positive shutoff, combined with extremely low torque operation, permitting fingertip control.

The systems and devices of this invention may be employed with working pressures from zero to 10,000 psi, and also with vacuum. The low torque, fingertip adjustable valves are provided with soft valve seats and adjustable stops, producing extremely low friction, non jamming action.

BACKGROUND OF THE INVENTION

Conventional pressure calibration systems are normally large, heavy stationary systems, incapable of convenient transport. In addition, when compressed gas pressure sources are connected to equipment to be calibrated, fine adjustment of the regulated calibration pressure has proved difficult.

Volumetric "vernier" adjustment controls changing the volume in the test conduit system by small amounts have been proposed, to provide such fine adjustments of calibration pressures, but separate isolation valves first connecting the source of pressure or the external vent to the test conduit system, and then isolating the test conduit system, have proved difficult to operate, requiring careful control and time-consuming manipulation of different valves in order to complete the calibration operation.

Accordingly, a significant need has developed in military, industrial and commercial applications for lightweight, portable pressure calibrating systems and devices which can be readily connected to pressure transducers and gages to be calibrated. Quick and convenient manual control of such systems for connecting and adjusting the regulated supply pressure have been recognized as a significant objective to be achieved, but successful devices and systems meeting this objective have not been manufactured or marketed, before the present invention.

Accordingly, a principal object of the present invention is to provide reliable high-pressure calibration systems and devices capable of accurate pressure calibration over a working range extending from a vacuum to 10,000 psi.

Another object of the invention is to provide such systems and devices which are light in weight, and conveniently portable.

Still another object of the invention is to provide such systems and devices which are capable of accurate and precise "vernier" adjustment of calibrating pressures over the entire working range.

A further object of the invention is to provide such systems and devices incorporating automatically actuated isolation valves capable of isolating the vernier pressure control system from supply pressure and from the atmosphere during the calibration process.

Still another object of the invention is to provide such pressure calibrating systems and devices whose manual valve controls are actuated by extremely low torque permitting fingertip adjustment.

A still further object of the invention is to provide such systems and devices capable of producing a firm, positive shutoff, disconnecting the pressure source and the atmosphere from the systems being calibrated, while requiring extremely low torque for actuation.

An additional object of the invention is to provide such pressure calibrating systems and devices incorporating soft valve seats, cooperating with fine valve needles to minimize the frictional engaging force produced by closing each valve to its shutoff position, with convenient adjustment of the closed valve position to compensate readily for valve seat wear.

Still another object of the invention is to provide such pressure calibrating devices incorporating pressure, vent and vernier valve mechanisms all of whose moving parts can be removed and replaced through the front panel of the device, avoiding disassembly for servicing.

Other objects of the invention will in part be obvious and will in part appear hereinafter.

The invention accordingly comprises the features of construction, combinations of elements, and arrangements of parts which will be exemplified in the constructions hereinafter set forth, and scope of the invention will be indicated in the claims.

For a fuller understanding of the nature and objects of the invention, reference should be made to the following detailed description taken in connection with the accompanying drawings, in which:

THE DRAWINGS

FIG. 5 is a cross-sectional elevation view taken along the plane 5—5 shown in FIG. 4, illustrating the central stepped bore machined in the center of the valve block to create the vernier adjustment cylinder;

Figure 4:
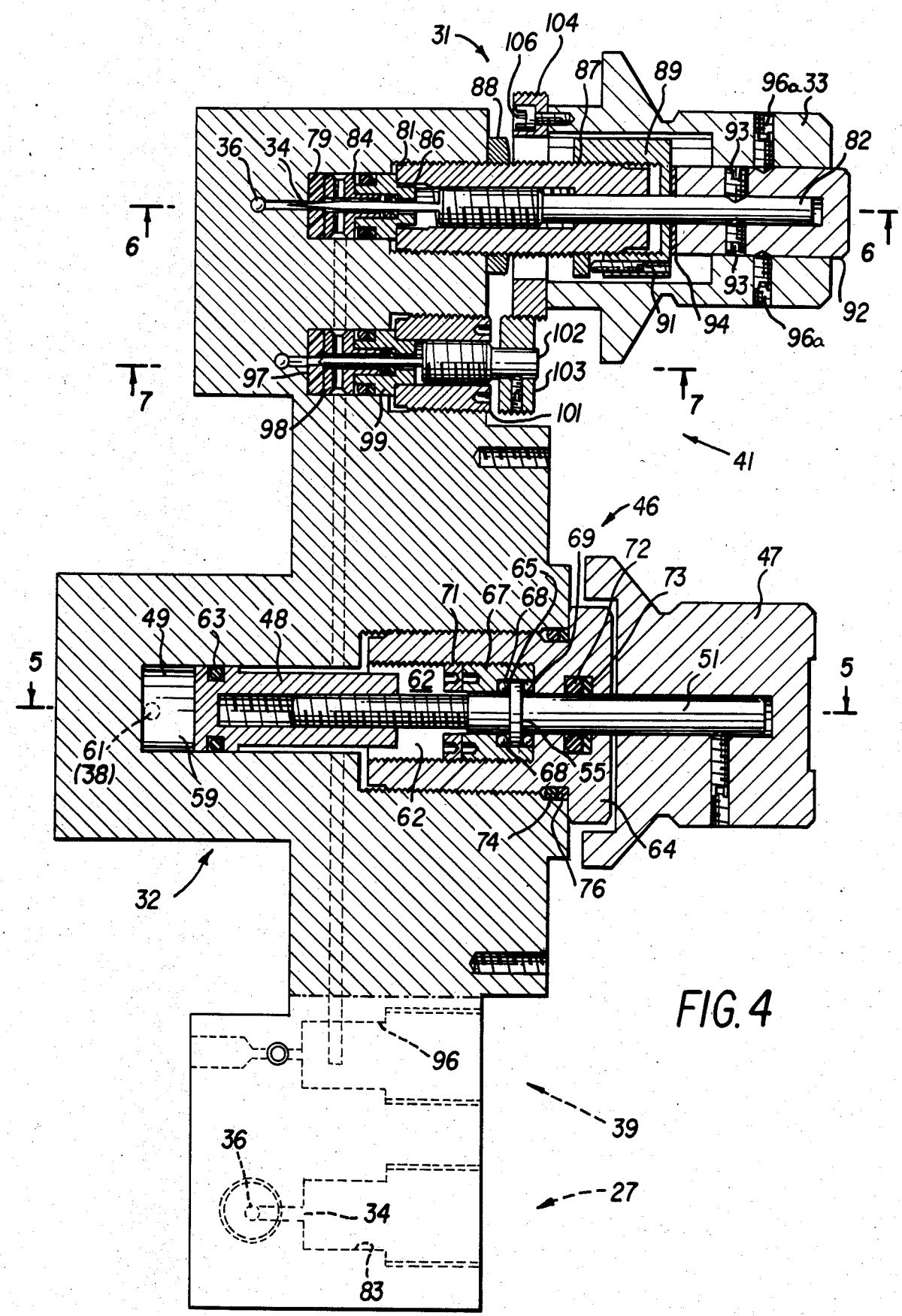
FIG. 4 is a cross-sectional top plan view taken along the central plane defined by the axes of the various valves and identified as plane 4—4 in FIG. 3, showing the various components illustrated in FIG. 3 in their assembled and installed positions.

FIG. 6 is a cross-sectional elevation view taken along the plane 6—6 shown in FIG. 4, illustrating the various bores machined in the end portions of the valve block to form the valve seat receiving cavities of the pressure valve and the vent valve in the assemblies of the invention; and FIG. 7 is a cross-sectional elevation view taken along the plane 7—7 shown in FIG. 4, illustrating the various bores machined in the valve block adjacent to those illustrated in FIG. 6 and forming the valve seat receiving chambers of the isolation valves respectively associated with the pressure valve and the vent valve in the valve assemblies of the present invention.

GENERAL DESCRIPTION

Figure 1:
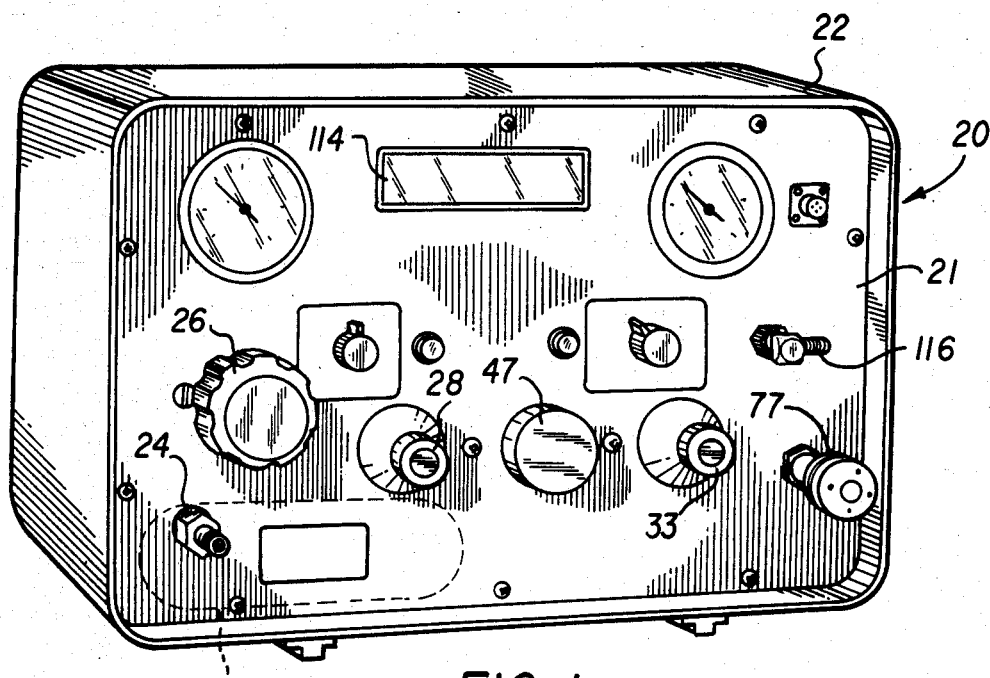
FIG. 1 is perspective view of a lightweight, portable high-pressure calibration console incorporating the systems and devices of the present invention.
Figure 2:
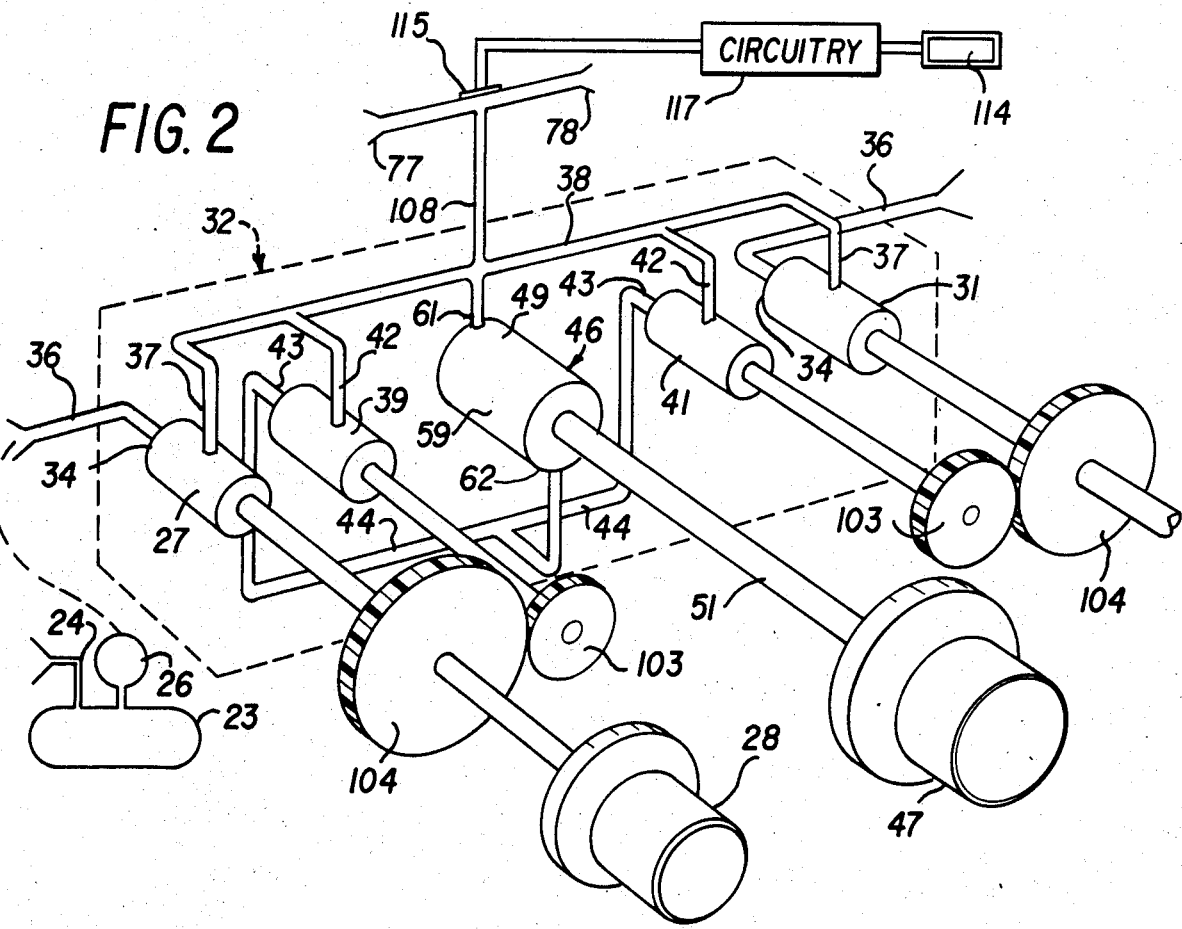
FIG. 2 is a schematic piping mechanism diagram showing the control valve assembly incorporated in the console of FIG. 1, including the pressure and vent control valves with their respective automatic isolation valves and a central vernier pressure adjustment assembly.

The pressure calibration console shown in FIG. 1 and in the perspective schematic valve assembly diagram of FIG. 2 incorporates the controls operated by the user in performing pressure calibrations using the devices of the present invention.

The pressure calibration console 20 with its front control panel 21, shown in FIG. 1, mounted in a portable carrying case 22, comprises the self-contained calibration system characterizing the present invention.

Case 22 incorporates an internal pressure source, a pressure cylinder 23 shown in dash lines in the lower left-hand corner of FIG. 1, which is filled with compressed nitrogen gas through a fill port 24 at the left lower portion of the console control panel 21. An external tank of compressed nitrogen not shown in the drawings is connected through a "pressure cable" hose and Swagelok fittings to the fill port 24. Prior to the filling operation, a "pressure unit control" regulator valve 26 is closed by counterclockwise rotation to its stop, and a pressure valve 27 is closed by similar counterclockwise rotation of its control knob 28 to its stop. Thereafter, by slowly opening the valve on top of the external nitrogen supply cylinder, not shown in the drawings, its compressed gas flows through fill port 24 into internal pressure tank 23 of the console 20. A "supply pressure" gage in the upper left corner of panel 21 shows the pressure in the internal storage tank cylinder 23. It should be noted that a pressure relief valve not illustrated in the drawings is connected to the system and adjusted to relieve excess pressures reaching ten percent above the highest pressures for which the system is designed. The internal pressure tank 23 and all pressure connections and fittings are preferably designed for fifty percent excess pressure over the maximum design pressures, providing an ample safety factor.

The Control Valve Assembly

Figure 3:
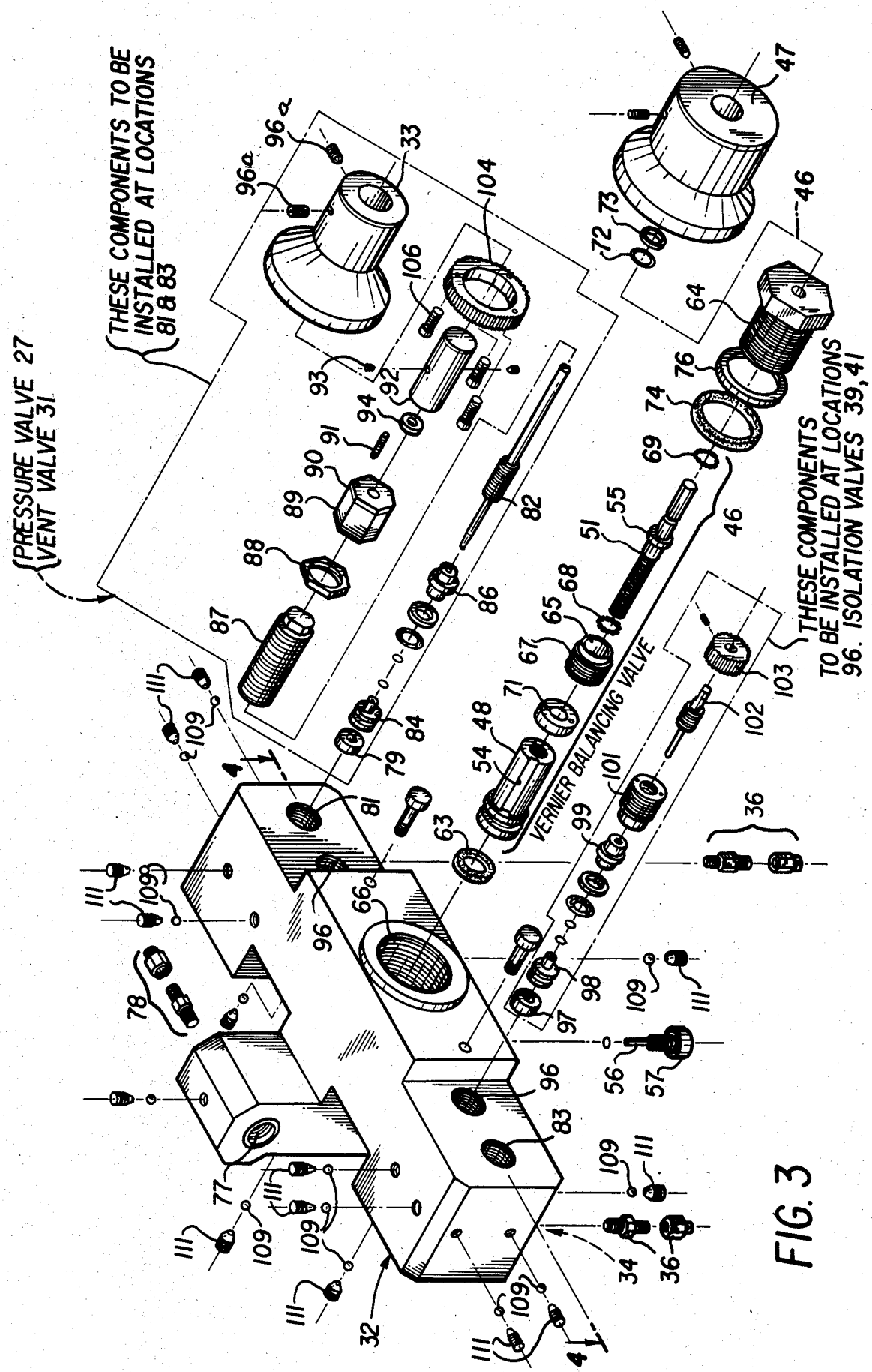
FIG. 3 is an exploded perspective view of the control valve assembly shown schematically in the diagram of FIG. 2, illustrating the component parts of the valves of this assembly and the valve block forming the common valve body or housing in which all of these valves are preferably installed.

The schematic perspective diagram of FIG. 2 and the exploded perspective view of FIG. 3 show the principal components of the control valve assembly, and the various parts which are assembled to form each component. The assembled parts are also shown in FIG. 4 in their installed condition, ready for final tightening and adjustment before use.

As indicated in FIG. 2, a pressure valve 27 is similar in construction and orientation to a vent valve 31 positioned at the opposite end of the valve block 32. Vent valve 31 is also provided with a knob 33 similar to the knob 28 of pressure valve 27, and vent valve knob 33 is shown in FIG. 1 but has been omitted from FIG. 2 for clarity. Valve block 32 is best shown in FIG. 3 and in the cross-sectional top plan view of FIG. 4, and it is shown schematically in dash lines in FIG. 2.

As shown in FIGS. 2, 4 and 6, pressure valve 27 and vent valve 31 are each provided with an end port 34. This port 34 of pressure valve 27 is connected directly via a pressure port 36 formed in the end of valve block 32 and the pressure regulator valve 26 to internal compressed gas supply cylinder 23. A similar port 36 venting to the atmosphere is formed in the opposite end of valve block 32 and connected to vent valve 31 by its end port 34 as indicated in FIG. 2.

Pressure valve 27 and vent valve 31 are each provided with a side port 37, as shown in FIGS. 2 and 6. When pressure valve 27 is opened, its end port 34 is connected to its side port 37. When vent valve 31 is opened, its end port 34 is connected to its side port 37. When the pressure or vent valves are closed, their respective ports are disconnected from each other, and no gas is allowed to flow through them. The side ports 37 of both pressure valve 27 and vent valve 31 connect directly to a pressure supply conduit 38, extending along the length of valve block 32, as shown in FIG. 2.

Adjacent to pressure valve 27 is a pressure isolation valve 39. Adjacent to vent valve 31 is a vent isolation valve 41. Each isolation valve 39 and 41 is provided with a side port 42 and an end port 43. Both side ports 42 connect directly to pressure supply conduit 38, as shown in FIG. 2. Both end ports 43 connect directly to a vernier balancing conduit 44. When the isolation valves 39 and 41 are closed, the side port 42 of each is disconnected from its end port 43, and the side and end ports of each respective isolation valve are connected when the isolation valves themselves are opened, thus admitting compressed gas from conduit 38 into conduit 44.

Vernier Pressure Adjustment Assembly

Centrally positioned in valve block 32 is the vernier balancing assembly 46 whose knob 47 is prominently positioned in the lower central portion of the control panel 21 of calibration console 20, as shown in FIG. 1. As indicated in FIG. 4, vernier balancing assembly 46 essentially comprises a piston 48, positioned in a cylinder 49. Piston 48 is advanced and retracted along the length of cylinder 49 by the operation of knob 47 keyed to a shaft 51 which is provided with a threaded distal end rotatably engaged in a threaded bore inside piston 48. Piston 48 is restrained against revolving, as threaded shaft 51 is turned by knob 47, because piston 48 is provided with a longitudinal spline or keyway groove 54 shown in FIG. 3. Groove 54 is engaged during assembly by a protruding guide tip 56 of a self-sealing screw 57 positioned in a threaded bore 58 formed in valve block 32 and extending from its external surface into the cylinder 49, as shown in FIG. 5. Thus the protruding tip 56 of screw 57 extends into cylinder 49 into sliding engagement with the spline or keyway groove 54 formed in piston 48.

Intersecting the threaded bore 58, near the internal wall of cylinder 49, is the vernier balancing conduit 44 shown in FIG. 5. By this means the proximal end of cylinder 49 is connected to vernier balancing conduit 44.

Installation of piston 48 with its groove 54 engaging the tip 56 of the self-sealing screw 57 thereby divides the vernier balancing cylinder 49 into two ends separated by piston 48, a distal end 59 communicating with supply conduit 38 through a supply port 61, entering cylinder 49 near its remote distal end, as indicated in FIGS. 2, 4 and 5, and a proximal end 62 connected by bore 58 to vernier balancing conduit 44.

The distal end of piston 48 is provided with an O-ring 63, mounted in a peripheral ring groove and forming the pressure barrier between the two ends 59 and 62 of the vernier balancing cylinder 49.

The rotatable shaft 51 of vernier balancing assembly 46 is positioned for rotation by an end cap 64 having an enlarged hexagonal head and a threaded tubular barrel portion threadedly engaged with an enlarged threaded portal aperture 66 forming a proximal opening of vernier cylinder 49, and communicating directly with proximal end 62 of cylinder 49. As shown in FIG. 4, the threaded barrel portion of end cap 64 is provided with a threaded internal bore which accommodates an externally threaded end bushing 67, having a central bore receiving the shaft 51 and an enlarged proximal bearing groove 65. This groove accommodates an enlarged peripheral flange 55 on shaft 51, and providing space for bearings, such as the rings of hardened balls 68 and 69 sandwiched between the enlarged peripheral flange 55 on shaft 51, the end cap 64 and the proximal groove 65 on the internal bore of end bushing 67. An externally threaded lock nut 71 is also threaded inside the threaded bore within the barrel of end cap 64, shown in FIG. 4, and torqued into position holding end bushing 67 seated in the threaded internal bore of cap 64.

Since both end bushing 67 and lock nut 71 are turned into deep internal engagement inside the barrel of end cap 64, they are provided with torquing apertures shown in cross-section in FIG. 4, accommodating a torque key or wrench which will reach deep inside the barrel of end cap 64 during assembly.

Also shown in FIG. 4 is a sealing O-ring 72 and a backup sealing ring 73 encircling the proximal end of shaft 51 in a sealing groove formed in end cap 64. A corresponding larger O-ring 74 and backup ring 76 encircle a slightly recessed groove at the proximal end of the threaded barrel portion of end cap 64, directly under its hexagonal head, where they are sandwiched between end cap 64 and portal 66 in block 32. The sealing ring 72-73 and 74-76 thus contain the pressure in the proximal end 62 of the vernier balancing cylinder 49 and prevent the escape of compressed gas from end chamber 62.

The Pressure and Vent Valve Assemblies

The vent valve assembly 31 shown at the upper end of FIG. 4 is identical to the corresponding pressure valve assembly 27 which is omitted from the lower end of FIG. 4 for the sake of clarity. The vent port 36 connected to end port 34 of vent valve 31 corresponds to the pressure port 36 shown in dash lines at the lower end of FIG. 4. Pressure supply conduit 38 communicates between the side ports 37 of both pressure valve 27 and vent valve 31 as well as supply port 61 of distal end chamber 59 of balancing cylinder 49, and the test ports 77 and 78 to which transducers or gages being calibrated are connected. Supply conduit 38 is shown schematically in FIG. 2 and in the cross-sectional elevation views of FIGS. 5, 6 and 7, and the vernier balancing conduit 44 connecting the end ports 43 of isolation valves 39 and 41 to proximal end 62 of vernier balancing cylinder 49 can also be seen in FIGS. 5, 6 and 7.

A ring-shaped polymer valve seat 79 encircles end port 34 in the blind end of the vent valve chamber 81, cooperating with a sharply tapering needle point of needle shaft 82, as shown at the upper end of FIG. 4. The similar pressure valve chamber 83 at the lower end of FIG. 4 accommodates the corresponding parts of pressure valve 27 not shown in FIG. 4. Tough, stable, pressure-and temperature-resistant polymers, which incorporate graphite or Teflon as additives for self-lubrication and wear-resistance, are preferred for ring-shaped valve seat 79.

A tubular needle valve collar 84 encircles the distal needle portion of needle shaft 82 adjacent to needle valve seat 79, with a central bore larger than the valve needle and transverse passages connecting the central bore of collar 84 to a peripheral groove encircling collar 84, communicating with pressure conduit 38 via side port 37, as may be seen by a comparison of FIG. 4 and FIG. 6.

A stem collar 86 encircles the proximal portion of collar 84, and is sandwiched between collar 84 and an externally threaded needle housing 87, threadedly engaged in an outer enlarged threaded portal portion of the valve chamber 81 accommodating vent valve assembly 31.

An internal threaded bore formed in needle housing 87 accommodates an enlarged threaded portion of the needle shaft 82, the proximal end of which is connected to vent knob 33 to provide the torque for advancing needle shaft 82 along the internal threaded bore in needle housing 87 to open and close the valve assembly 31 by advancing the distal needle point portion of shaft 82 into engagement with valve seat 79. Needle housing 87 is installed by advancing it in threaded engagement with valve block 32 until its distal end is seated against an internally projecting shoulder in the chamber 81, providing the predetermined desired degree of force tending to compress polymer valve seat 79 to the extent desired. Lock nut 88 torqued against valve block 32 secures needle housing 87 in this engaged position. As is readily seen at the upper portion of FIG. 4, O-ring and backup ring pairs are installed between collar 86, needle shaft 82 and collar 84, and also between collar 86, and the valve block 32, performing the same sealing function as O-ring and backup ring pairs 72-73 and 74-76. O-rings of Buna N synthetic rubber are suitable for low pressure use, while "VITON" fluorocarbon elastomer O-rings are preferred for high-pressure use. Backup rings of nylon retain the flexible elastomer O-rings in their desired orientation under pressure.

Mounted in threaded engagement with the external threads on needle housing 87 is a split lock nut 89, having a radial sector slot 90 formed in its periphery with a coaxial set screw 91 threaded into a threaded bore near its periphery, extending across the radial sector slot into abutting engagement with the distal portion of lock nut 89 beyond the sector slot 90. Adjustment of lock nut 89 on needle housing 87 provides a variable stop against which knob 33 can be brought to rest in its counterclockwise "off" position. By tightening set screw 91, lock nut 89 can be locked in any desired adjusted stop position, corresponding to seated engagement of the distal needle portion of needle shaft 82, closing the opening in valve seat 79. A hollow cylindrical knob insert 92 is anchored by set screws 93 to the proximal end of needle shaft 82, and a low friction Teflon polytetrafluoroethylene washer encircles shaft 82 between lock nut 89 and knob insert 92. Unthreading counterclockwise adjustment of lock nut 89, unscrewing it from needle housing 87, causes lock nut 89 to move toward the right in FIG. 4 until it is brought up into abutting engagement with the low friction Teflon washer 94.

After a considerable period of use, the valve seat 79 may exhibit signs of wear, permitting the distal needle portion of needle shaft 82 to move further toward valve seat 79 before sealing of the valve 31 in its "off" position is achieved. Loosening set screw 91 and advancing lock nut 89 on needle housing 87 provides leeway for repositioning of the knob insert 92 and its associated knob 33. When knob 33 is removed from knob insert 92, by backing out set screws 96a, this provides ample maneuvering space for adjustment of lock nut 89 and its set screw 91.

Isolation Valve Assemblies

Each of the principal control valves, pressure valve 27 and vent valve 31, is provided with its own respective companion isolation valve 39 or 41. Valve 41 is shown in cross-section in FIG. 4, where isolation valve 39 has been removed from its isolation valve chamber 96 for simplicity.

The construction of the valve seat engaging parts of isolation valves 39 and 41 is generally similar to the construction of the corresponding parts of pressure control valve 27 and vent valve 31. Thus, each of the isolation valves incorporates a ring-shaped polymer valve seat 97, a needle valve collar 98 and a stem collar 99, all clamped in seated position by a stem bushing 101 formed with internal threads accommodating the threaded portion of the isolation valve needle shaft 102, as well as external threads providing its threading engagement with the enlarged threaded portal aperture of isolation valve chamber 96.

One significant difference between the isolation valves and their associated control valves is the bluntness of the isolation valve needles at the distal ends of needle shafts 102. The sharply tapered distal needle point at the end of needle shaft 82 in each of the control valves may have an included acute angle between five degrees and ten degrees, for example, and is preferably formed with an included angle of approximately seven degrees, while the isolation valve needle shaft 102 may be provided with a blunt needle having an included angle between 30 and 50 degrees, for example, and which is preferably about 40 degrees.

Stem bushing 101 is provided with torquing apertures in its exposed proximal end permitting it to be torqued in threaded engagement with the enlarged threaded portal of isolation valve chamber 96 until valve collar 98 and stem collar 99 are thereby forced to the left into the blind end of chamber 96, compressing the ring-shaped polymer valve seat 97 in the same manner that the polymer valve seat 79 is compressed by the installation of needle housing 87 in the control valve 31.

Mounted on the exposed proximal end of isolation needle valve shaft 102 is a spur gear 103, with its peripheral teeth in driving engagement with the teeth of a larger spur gear 104, anchored by a plurality of mounting screws 106 to the distal rim of control knob 33, as shown in FIG. 4. The gear ratio of gear 104 to gear 103 is preferably 2:1. In addition, the threads formed in the interior bore of stem bushing 101 and the threaded portion of isolation needle shaft 102 engaged therewith are provided with left-hand threads. By this means, counterclockwise manipulation of control knob 33 to open vent valve 31 causes simultaneous clockwise rotation of gear 103 on isolation needle valve shaft 102. The resulting clockwise rotation of shaft 102 causes the blunt distal needle portion of shaft 102 to withdraw axially from its valve seat 97 at a rate double the rate at which the sharp distal needle portion of needle shaft 82 withdraws axially from its valve seat 79 in the control valve 31.

Thus the blunt included angle at the end of the isolation valve needle, as compared with the acute included angle at the tip of the control valve needle, combined with the 2:1 gear ratio assuring that the isolation valve needle is withdrawn at double the rate produced by manipulation of knob 33 for the control valve needle, produces the desirable result of assuring the the isolation valve always opens before the control valve effectively opens, and always closes after the control valve effectively closes. The respective angular positions at which both needle valves are closed may be adjusted independently as desired with knob 33 removed from knob insert 92, disengaging gears 104 and 103. When the paired companion valves are both in their seated positions, installation of knob 33 on knob insert 92, with gears 103 and 104 in meshing engagement, and tightening of set screws 96 to secure knob 33 in this mounted position, assures the ganged operation of these companion valves with automatic isolation valve operation whenever the main control valve is manipulated.

Pressure Conduit Passageways and Seals

As indicated in FIGS. 5, 6 and 7, valve block 32 is employed to connect the operating valves, the isolation valves and the vernier balancing valve by way of the ports and passageways illustrated schematically in FIG. 2, employing long drilled bores extending lengthwise throughout the entire length of valve block 32 to produce conduits 38 and 44, with shorter transverse drilled bores connecting these conduits to the valve ports.

Thus, as illustrated in FIG. 5, longitudinal bores 38 and 44 are shown in the central portion of the cross-section, flanking vernier balancing cylinder 49. Supply conduit 38 is connected to the remote distal end of cylinder 49 by a bore 107 entering block 32 from its rear face and intersecting conduit 38, which crosses an intersecting bore 108 perpendicular to the axis of cylinder 49, completing the connection from supply conduit 38 to the distal end of cylinder 49 and also connecting supply conduit 38 to test ports 77 and 78.

FIGS. 6 and 7 illustrate similar bores from an external surface of valve block 32 intersecting each other as required to connect port 36 with the end port 34 of the pressure or vent valve chambers. In FIG. 7, comparable bores connect conduit 44 to the end port 43 of the isolation valve chamber. Machine cap screws threaded into the exposed outer ends of these bores with an O-ring seal sandwiched between valve block 32 and each cap screw head may be employed to close the outer ends of such bored passageways in the lower pressure embodiments of the invention carrying pressures up to 2,000 or 2,500 psi, as illustrated in FIG. 5.

Since high-pressure calibration versions of the invention employ internal pressures ranging as high as 10,000 psi, with design limit pressures as high as 15,000 psi being contemplated, slightly more elaborate sealing assemblies are required to contain these higher pressures. For example, the sealing assemblies illustrated in FIGS. 3, 6 and 7 employ a hardened alloy ball 109 seated at the bottom of a threaded portal forming the outer end of each bore and held in place by a set screw 111 having a concave ball-centering recess on its inner end. Thus, as shown in FIG. 7, the hardened alloy balls 109 are clamped in position closing the internal bores in valve block 32 by set screws 111 which are tightly torqued to produce firm seated engagement of the hardened ball in its sealing position.

In FIG. 5, by contrast, the outer end of passage 108 is sealed only by a threaded cap screw 112, having an O-ring 113 positioned under its head for sealing engagement with the periphery of the bore 108 as screw 112 is threaded into firm engagement with valve block 32 in the threaded portal end of bore 108. This cap screw and O-ring seal assembly is entirely suitable for working pressures up to 2,500 psi.

Calibration Procedure

The calibration console 20, shown in FIG. 1, preferably incorporates internal microprocessor circuitry 117 with self-calibrating pressure transducer circuits preferably powered by 117 volt AC line voltage. The console control panel 21 is preferably supplied with two "pressure cable" hoses for connection of fill port 24 to an external compressed nitrogen cylinder, and for connecting test ports 77 and 78 to pressure equipment to be calibrated. These pressure cable hoses are preferably Teflon lined with stainless steel wire braid reinforcement, fitted with quick disconnect end fittings. The overall portable calibration console 20 enclosing all circuitry 117 and controls can be contained in a $10'' \times 12'' \times 16''$ case 22, weighing no more than 28 lbs including the pressure cable hoses.

In order to use the calibration console 20, a short stabilizing warmup period after connection of line voltage may be followed by self-calibrating a zero setting with vent valve 31-33 open to the atmosphere. Thereafter, vent valve 31-33 is closed and pressure valve 27-28 may be gently opened counterclockwise about one-half turn. The numerical pressure display on the screen 114 indicates the pressure sensed by a transducer 115 in supply conduit 38 and produced by admitting compressed nitrogen from internal tank 23 via pressure valve 27-28. As the pressure approaches the desired value on screen 114, pressure valve 27-28 may be turned slowly clockwise toward its closed position. If excess pressure has been achieved, vent valve 31-33 may be slowly opened counterclockwise to relieve this over pressure to the atmosphere. Thus only two alternative valves need be manipulated: knob 28 raises the pressure, knob 33 lowers the pressure.

When the indicated pressure in supply conduit 38 is close to the desired value, and both knobs 28 and 33 have been turned clockwise to their closed seated positions, fine adjustment of the pressure in conduit 38 is achieved by gentle rotation of knob 47, advancing or retracting vernier piston 48 in its cylinder 49 to reduce or increase the volume contained in supply conduit 38 and all associated passageways including the gages or transducers under calibration test. This simple volumetric increase or decrease is entirely non-critical, and may be adjusted and readjusted as desired until an exact pressure value is achieved in this enclosed volume.

The operation of isolation valves 39 and 41 in facilitating this vernier balancing pressure adjustment is easily understood from an inspection of FIG. 2 in conjunction with FIG. 4. When pressure valve 27-28 is opened, for example, its spur gear train 104-103 assures that the companion isolation valve 39 will open first to connect supply conduit 38 with vernier balancing conduit 44, and this connection will be maintained whenever pressure valve 27 is open. As knob 28 is turned clockwise to close pressure valve 27, the same gear train drives the blunt isolation needle shaft toward its closed position simultaneously, assuring that isolation valve 39 will be closed at the time or just after the tapered needle valve shaft 82 finally seats on its ring-shaped valve seat 79.

Whenever vent valve 31-33 is opened, the same automatic operation of its companion isolation valve 4 occurs, because isolation valve 41 is opened and closed in direct conjunction with the control valve 31-33. Operation of these isolation valves is automatic and requires no effort or attention on the part of the operator. The 2:1 gear ratio of the gear trains 104-103 and the blunt shape of the distal needle end of isolation needle shaft 102 assures that simultaneous opening of the isolation valve will proceed faster and farther than the contemporaneous opening of the associated control valve, and the same features assure that each isolation valve will close by the same farther and faster operation to reach its sealing position only after the tapered distal needle end of control needle shaft 82 is almost completely seated in its seal 79.

By connecting a vacuum pump to the vent vacuum port 116 on the control panel 21 of console 20, and after operating the pump long enough to evacuate the system, the circuitry may be adjusted to a zero reading corresponding to the vacuum drawn by the vacuum pump. Using this as the zero pressure value, absolute pressure calibrations of the equipment under test may be performed with the vent valve 31-33 connecting the system to the evacuated "zero" pressure rather than to the atmosphere.

In the high-pressure embodiment of the invention, compressed gas from the internal pressure cylinder 23 is delivered to a booster pump or pressure intensifier having a 10:1 pressure ratio, whose output is fed to a small accumulator having an internal volume of only a few cubic inches. The accumulator pressure is then connected to pressure port 36 and the system is operated as previously described.

The use of a digital display screen 114 and its associated circuitry 117 provides precise pressure information and eliminates interpolation, parallax and operator judgment inaccuracies in reading pressures from a dial gage. The relatively soft seats 79 and 97 in the control needle valves and the isolation needle valves provide firm, solid shutoff action, while the Teflon washers 94, coupled with the relatively small contact area between the valve needles and their seats reduces the operating torque required to actuate the control knobs 28 and 33 to such low values that fingertip control is conveniently achieved. As indicated in FIG. 4, the removal of the control knobs 28, 33 and 47 and the valve components thereby made accessible, permits all of the working parts of all valve assemblies and the vernier balancing piston assembly to be removed directly through the front panel 21 of calibration console 20 for convenient maintenance or replacement of parts.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A portable pressure calibration console having a housing incorporating
   a compressed gas storage cylinder having a fill port, and an outlet port including a pressure regulator,
   at least one test port for connection to pressure sensing equipment to be calibrated,
   a pressure transducer display assembly connected to measure and display to the user the pressure existing at the test port, a control valve assembly including a pressure valve alternatively connecting and disconnecting the storage cylinder pressure regulator outlet to the test port by way of a pressure conduit, and a vent valve alternatively connecting and disconnecting the pressure conduit and a vent port for exhausting the pressure conduit, the pressure valve and the vent valve each incorporating a threaded valve housing and a threaded needle shaft, axially advanced and retracted by its threaded engagement with the valve housing, a ring-shaped polymer valve seat, the needle shaft having a tapered needle point engageable with the valve seat, a manual control knob keyed to the needle shaft, and a low-friction washer sandwiched between the manual control knob in its valve-closed position and the valve housing, whereby closing of the vent valve and opening of the pressure valve supplies compressed gas to the pressure conduit and the test port whose pressure is measured and displayed by the transducer display assembly, with the tapered needle point and cooperating polymer valve seat of the pressure and vent valves providing precise pressure control and positive shutoff with low actuating torque, and the low-friction washers avoiding jamming of the control knobs in their closed positions.

2. The pressure calibration console defined in claim 1, wherein each control valve assembly incorporates a valve casing having a valve chamber in which the ring-shaped polymer valve seat is installed, connected by a shoulder step to an enlarged threaded portal in which the valve housing is threadedly engaged, with annular collar means encircling the needle point and sandwiched between the valve seat and the valve housing, the collar means being dimensioned to apply a predetermined compression force to the polymer valve seat when the valve housing is threadedly advanced into abutting seated engagement with the shoulder step of the valve chamber.

3. The pressure calibration console defined in claim 1, further including a balancing piston-cylinder assembly having a balancing cylinder and a balancing piston reciprocable therewithin, dividing the cylinder into a distal pressure chamber connected to the pressure conduit and a proximal balancing chamber, said piston being connected by a piston rod extending through the balancing chamber to a balancing knob mounted to produce reciprocating movement of the piston in the cylinder, a balancing conduit connected to the balancing chamber of said cylinder, a pair of isolation valves, each respectively associated with one said control valve and operatively connected to admit compressed gas from the pressure conduit to the balancing conduit in its open condition and to disconnect the balancing conduit from the pressure conduit in its closed position, and isolation valve-actuating means connected to actuate each isolation valve automatically as its associated control valve is actuated, whereby compressed gas admitted to the pressure conduit by the pressure control valve is also admitted to the balancing conduit, producing equal pressure in each chamber of the balancing cylinder, providing, after closure of the pressure control valve, a readily actuated pressure-balancing means for fine vernier adjustment of the pressure in the pressure conduit, the distal pressure chamber and the pressure sensing equipment connected to the test port and having the pressure thereof indicated on the pressure transducer display assembly.

4. The pressure calibration console defined in claim 3, wherein the control valves and the isolation valves are formed in a common valve block having chambers formed therein accommodating the valve seats and seat engaging parts of all said valves.

5. The pressure calibration console defined in claim 4, wherein said common valve block is also provided with a chamber formed therein comprising the balancing cylinder.

6. The pressure calibration console defined in claim 5, wherein the valve chambers and the balancing cylinder are formed as chambers extending into the valve block from its front face, and the balancing piston rod and all valve needle shafts and isolation valve actuating means are installed through and removable from the front face of the valve block.

7. The pressure calibration console defined in claim 4, wherein the pressure conduit and the balancing conduit are formed as elongated bores extending into the valve block whose open ends are sealed from the atmosphere by threaded sealing screws.

8. The pressure calibration console defined in claim 7, wherein the sealing screws are threaded into enlarged threaded portals, further including a hardened metal ball, closing the conduit bore, clamped inside each portal by the sealing screw threaded therein.

9. The pressure calibration console defined in claim 3, wherein both the control valves and the isolation valves are needle valves having ring-shaped polymer valve seats.

10. The pressure calibration console defined in claim 9, wherein the isolation valve needles are provided with blunt tips having an included angle between 30 degrees and 50 degrees while the control valve needles are provided with sharper tips having included angles between 5 degrees and ten degrees.

11. The pressure calibration console defined in claim 10, wherein the isolation valve needles' included angle is substantially equal to 40 degrees, while the control valve needles' included angle is substantially equal to 7 degrees.

12. The pressure calibration console defined in claim 9, wherein the control valves and their associated isolation valves are installed in respective valve chambers in which the ring-shaped polymer valve seat is positioned, each valve chamber being connected by a shoulder step to an enlarged threaded portal in which a respective valve housing is threadedly engaged, with the needle point being encircled by annular collar means sandwiched between the valve seat and the valve housing, and dimensioned to apply a predetermined compression force to the polymer valve seat when the valve housing is threadedly advanced into abutting seated engagement with the shoulder step of the valve chamber.

13. The pressure calibration console defined in claim 9, wherein the isolation valve needles and the control valve needles are all threaded into their respective threaded housings and provided with actuating needle shafts protruding therefrom, and wherein a step-up gear train connects each control valve needle shaft to its associated isolation valve needle shaft.

14. The pressure calibration control console defined in claim 13, wherein the step up gear ratio is 2:1, whereby the isolation valve needle advances twice as fast as its associated control valve needle advances.

15. The pressure calibration console defined in claim 13, wherein the control valve needles and housings have right hand threads and the isolation valve needles and housings have left-hand threads, and wherein each step-up gear train comprises a gear keyed to the control valve needle shaft engaged with a smaller gear keyed to the associated isolation valve needle shaft.

16. The pressure calibration console defined in claim 3, wherein the isolation valve-actuating means is connected to actuate the isolation valve automatically at a faster rate than its associated control valve's actuation rate.

17. The pressure calibration console defined in claim 3, wherein the proximal chamber end of the balancing cylinder is pressure-sealed by a threaded end cap threadedly engaged with the cylinder and incorporating a low-friction shaft bearing centrally positioning the piston rod for rotational movement actuated by the balancing knob keyed on the piston rod.

18. The pressure calibration console defined in claim 17, wherein the piston rod is threadedly engaged in a threaded bore formed inside the balancing piston, with the piston being formed with a lengthwise external groove, and with a key tip being installed protruding into the cylinder into sliding engagement with the key groove, whereby rotational movement of the piston rod actuates axial movement of the piston threaded thereon guided by sliding movement of the key groove relative to the key tip engaged therein.

19. The pressure calibration console defined in claim 17, wherein the pressure-sealing end cap is provided with a first elastomer seal mounted between its periphery and the cylinder, and a second elastomer seal encircling the piston rod between the low-friction shaft bearing and the balancing knob.

20. The pressure calibration console defined in claim 17, wherein the low-friction shaft bearing comprises a plurality of rings of hardened balls in rolling contact between the piston rod and the end cap.

21. A high-pressure metering valve having low operating torque, comprising a valve casing enclosing a valve chamber having an end port and a side port, and an enlarged threaded portal connected to the valve chamber by a shoulder step, a threaded valve housing engageable in the threaded portal and having an internal threaded bore, a threaded needle shaft threadedly engaged in said bore and having a sharply tapered distal needle tip extending toward the end port, having an included angle between 5 degrees and 10 degrees, axially advanced and retracted by its threaded engagment with the valve housing, and a proximal actuating end protruding from the valve housing, a ring-shaped polymer valve seat in the valve chamber encircling the end port and having a proximal face penetrated by a cylindrical central bore engageable by the sharply tapered distal needle tip in its advanced position, annular rigid collar means encircling the needle tip sandwiched between the proximal face of the valve seat and the valve housing and dimensioned to apply a predetermined compression force to substantially the entire proximal face of the polymer valve seat when the valve housing is threadedly advanced into abutting seated engagement with the shoulder step, said collar means being apertured to connect the space surrounding the sharply tapered distal needle tip to said side port.

22. The high-pressure metering valve defined in claim 21, further including an actuating knob clamped to the protruding proximal actuating end of the needle shaft, and a lock nut threaded on the threaded valve housing and lockable in any adjusted position, with a low friction polymer washer being sandwiched between the actuating knob and the lock nut providing a non-jamming closure-limiting seat for the actuating knob, adjustable by adjusting the lock nut.

23. The high-pressure metering valve defined in claim 21, further including a knob insert sleeve clamped to the protruding proximal actuating end of the needle shaft, a lock nut threaded on the threaded valve housing and lockable in any adjusted position, with a low-friction polymer washer being sandwiched between the knob insert sleeve and the lock nut providing a non-jamming closure-limiting seat for the knob insert sleeve adjustable by adjusting the lock nut, and an actuating knob clampable on the knob insert sleeve having a barrel portion surrounding the lock nut and concealing it from view.

* * * * *